(12) United States Patent
Preta et al.

(10) Patent No.: US 8,657,021 B1
(45) Date of Patent: Feb. 25, 2014

(54) SMART FIRE HYDRANTS

(76) Inventors: Joseph Frank Preta, Tampa, FL (US); William Monty Simmons, Lenoir, NC (US); Floyd Stanley Salser, Jr., Ocala, FL (US)

(*) Notice: Subject to any disclaimer, the term of this patent is extended or adjusted under 35 U.S.C. 154(b) by 26 days.

(21) Appl. No.: 13/159,360

(22) Filed: Jun. 13, 2011

Related U.S. Application Data

(60) Continuation-in-part of application No. 12/143,822, filed on Jun. 23, 2008, now Pat. No. 7,994,935, which is a continuation of application No. 10/989,811, filed on Nov. 16, 2004, now Pat. No. 7,498,953, and a division of application No. 12/050,160, filed on Mar. 17, 2008, now Pat. No. 7,980,317, which is a continuation-in-part of application No. 11/176,919, filed on Jul. 7, 2005, now Pat. No. 7,283,063, and a continuation-in-part of application No. 10/989,811, filed on Nov. 16, 2004, now Pat. No. 7,498,953.

(60) Provisional application No. 60/895,104, filed on Mar. 15, 2007.

(51) Int. Cl.
*A62C 37/12* (2006.01)
*A62C 3/00* (2006.01)

(52) U.S. Cl.
USPC .................................. 169/61; 169/54; 169/60

(58) Field of Classification Search
USPC ......... 169/51, 54, 60, 61; 137/272, 551, 78.1, 137/78.5; 340/540
See application file for complete search history.

(56) References Cited

U.S. PATENT DOCUMENTS

| | | | | | |
|---|---|---|---|---|---|
| 4,440,190 | A | * | 4/1984 | Barbe | 137/272 |
| 4,561,459 | A | * | 12/1985 | Jackman | 137/291 |
| 4,617,956 | A | * | 10/1986 | Sievers | 137/272 |
| 4,719,973 | A | * | 1/1988 | Allen et al. | 169/61 |
| 4,805,862 | A | * | 2/1989 | Wissman | 248/229.1 |
| 4,887,674 | A | * | 12/1989 | Galosky et al. | 169/61 |
| 5,038,866 | A | * | 8/1991 | Kern et al. | 169/28 |
| 5,373,889 | A | * | 12/1994 | Bouc et al. | 164/15 |
| 5,864,287 | A | * | 1/1999 | Evans et al. | 340/506 |
| 6,195,002 | B1 | * | 2/2001 | Evans et al. | 340/506 |
| 6,816,072 | B2 | * | 11/2004 | Zoratti | 340/540 |
| 7,099,781 | B1 | * | 8/2006 | Heidl et al. | 702/45 |
| 7,306,167 | B2 | * | 12/2007 | Colarusso et al. | 239/69 |
| 7,597,113 | B2 | * | 10/2009 | Garcia et al. | 137/293 |
| 7,604,023 | B2 | * | 10/2009 | Buckner et al. | 137/899.4 |
| 7,740,081 | B2 | * | 6/2010 | Edwards et al. | 169/60 |
| 7,980,317 | B1 | * | 7/2011 | Preta et al. | 169/61 |
| 2005/0108261 | A1 | * | 5/2005 | Glassy et al. | 707/100 |
| 2007/0005273 | A1 | * | 1/2007 | Heidl et al. | 702/50 |
| 2007/0120664 | A1 | * | 5/2007 | Bilbrey et al. | 340/539.32 |
| 2010/0200088 | A1 | * | 8/2010 | Marshall et al. | 137/551 |

* cited by examiner

*Primary Examiner* — Len Tran
*Assistant Examiner* — Alexander M Valvis
(74) *Attorney, Agent, or Firm* — Monty Simmons; Simmons Patents

(57) ABSTRACT

The present invention relates to smart monitor for fire hydrants. One embodiment of the smart monitor comprises an electronic module associated with an operating nut and nut shaft. The electronic module may be an integral part of the fire hydrant design or it may be a part of an upgrade kit for upgrading existing fire hydrant installations. The electronic module may be configured to detect when a fire hydrant has been accessed and transmit a data signal to a remote location. The electronic module may comprise any number of environmental sensors configured to monitor the water flowing through a fire hydrant, the status of the fire hydrant, and the environment surrounding the fire hydrant. One such environmental sensor a radiation sensor configured to detect ionizing radiation.

14 Claims, 14 Drawing Sheets

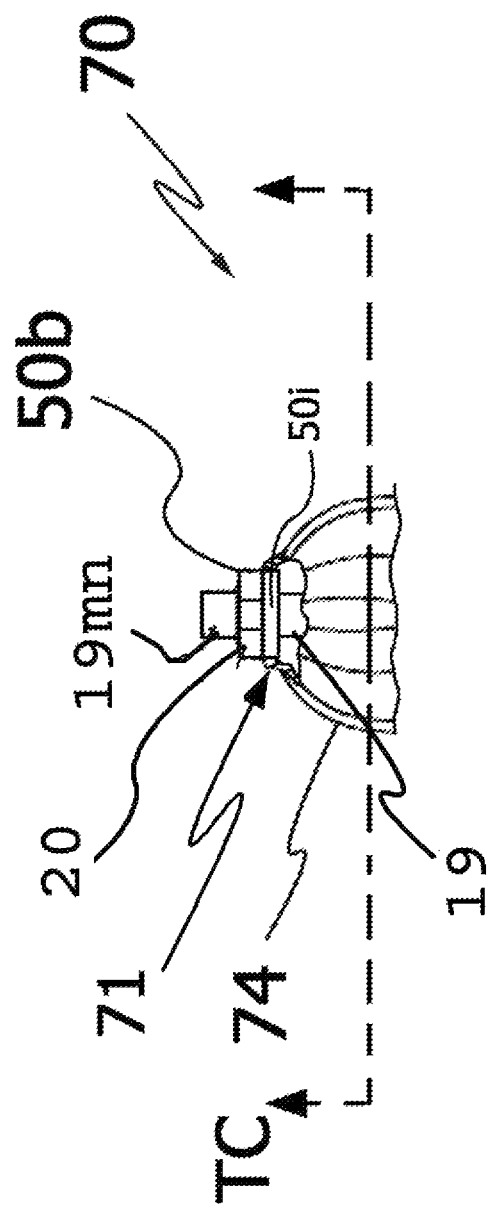

SMART FIRE HYDRANTS

CLAIM TO PRIORITY

This application is a continuation in part to U.S. application Ser. No. 12/143,822, (now U.S. Pat. No. 7,994,935) filed on Jun. 23, 2008, which is a continuation of Ser. No. 10/989,811, (now U.S. Pat. No. 7,498,953), filed on Nov. 16, 2004; and as a divisional to application Ser. No. 12/050,160, (U.S. Pat. No. 7,980,317), filed on Mar. 17, 2008, which claims priority to provisional application 60/895,104, filed on Mar. 15, 2007, and is a continuation in part to U.S. Pat. No. 7,283,063 which issued from application Ser. No. 11/176,919 filed on Jul. 7, 2005, and as a continuation in part to U.S. Pat. No. 7,498,953 which issued from application Ser. No. 10/989,811 filed Nov. 16, 2004, the entire contents of all such references of which are incorporated herein by this reference for all that they disclose for all purposes.

TECHNICAL FIELD OF THE INVENTION

The present invention relates to smart fire hydrants. One embodiment of the smart fire hydrant comprises an electronic module associated with operating nut and nut shaft. The electronic module may be an integral part of the fire hydrant design or it may be a part of an upgrade kit for upgrading existing fire hydrant installations.

BACKGROUND OF THE INVENTION

A fire hydrant, (a.k.a. fire plug, johnny pump) is an active fire protection measure. Fire hydrants provide a source of water in most urban, suburban and rural areas with municipal water service. The concept of fire plugs dates to at least the 1600s and during such ear firefighters responding to a call would dig down to the water mains and hastily bore a hole to secure water to fight fires. When no longer needed, such holes were then plugged with stoppers. Thus was born the fire plug; a colloquial term still used for fire hydrants today.

While U.S. Pat. No. 37,466, (issued in 1963 to Richard Stileman), concerns an early cast iron hydrant and U.S. Pat. No. 80,143, (issued in 1968 to Zebulon Erastus Coffin), concerns a cast iron hydrant very similar to modern fire hydrants, Birdsel Holly (U.S. Pat. No. 94,749) is often credited for inventing the cast iron fire hydrant. Such patents are incorporated by this reference for all that they disclose. Old fire hydrant designs and modern fire hydrants, such as the ones manufactured by Mueller Company, still have at least one important characteristic in common; they have not taken full advantage of the advances in electronics to provide needed monitoring and information recording/transmitting services.

First, there is a need for an electronic module that can provide information as to when a hydrant was last serviced. New hydrants normally have a one to five years warranty. Consequently, most water utilities require annual inspections and maintenance of there fire hydrants. Such inspections are generally only performed on fire hydrants that are owned by water utilities. However, there are some privately owned fire hydrants that may never be inspected after installation. In the city of Chicago, for example, there are over 30 million government owned and maintained fire hydrants. Clearly, maintaining a fire hydrant maintenance schedule can be a daunting task. What is needed is an electronic module associated with each fire hydrant that can (1) detect when it has been serviced, and/or (2) be "told" when it has been serviced (and retain such information in memory). Such a device would preferably be programmed to track time and inform the utility when it is time for it to be serviced.

Second, many fire hydrant manufacturers recommend lubricating the head mechanism and restoring the head gaskets and o-rings annually so that the fire hydrant performs adequately when needed. What is needed is an electronic module with sensors that can monitor such a hydrant's lubricating chamber for sufficient lubricant and notify the utility when insufficient lubricant is suspected.

Third, there is a need for an electronic module to monitor a fire hydrant for unauthorized access. To prevent casual use or misuse, modern hydrants typically require special tools to be opened. Such tools normally include a large wrench with a pentagon-shaped socket. However, such a wrench is not that difficult to fabricate by those who sometimes cause monetary loss by wasting water when they open hydrants for various reasons. Such vandalism can also reduce municipal water pressure and impair firefighters' efforts to extinguish fires. Sometimes those simply seeking to play in the water remove the caps and open the valve, providing residents (especially children) a place to play and cool off in summer.

Still further, with so much development going on across the county, water utilities are noticing an increasing problem of people illegally tapping into the system. For example, the town of Oakland, Florida states that water theft from hydrants close to large construction job sites is becoming an increasing problem with larger amounts of water being stolen every month. Some unscrupulous subcontractors will illegally tap a fire hydrant to get water for cement mixing, fugitive dust control, equipment cleaning, and other construction-related uses. Additionally, others may illegally access fire hydrants to get water to fill swimming pools, wash down streets and water newly sodded lawns. All such activity is illegal, and utilities are vowing to prosecute anyone caught stealing water. One major problem with prosecuting water thief is lack of evidence as it is difficult to catch a person in the act of stealing water. What is needed is an electronic module that can notify a utility when their hydrant is accessed. Moreover, there is a need for an electronic module that can record sound and/or image data when a fire hydrant is accessed perhaps providing evidence for prosecuting those who steal water.

Fourth, there is a need for an electronic module that monitors back flow prevention valves to verify they are working properly. In most US areas, contractors who need temporary water may purchase permits to use hydrants. The permit will generally require a hydrant meter, a gate valve and sometimes a clapper valve (if not designed into the hydrant already) to prevent back-flow into the hydrant. Unfortunately, there is currently no method to detect when there has been a back flow condition due to a non existent or faulty backflow prevention element. Thus, there is a need for an electronic module that can detect and report such an event.

Fifth, in areas subject to freezing temperatures, there is a need to know the minimum temperature a hydrant has experienced and if the barrel of "dry hydrant" is truly dry. Typically in such areas, only a portion of the hydrant is above ground. The valve is located below the frost line and connected via a riser to the above-ground portion. A valve rod extends from the valve itself up through a seal at the top of the hydrant, where it can be operated with the proper wrench. This design is known as a "dry barrel" hydrant, in that the barrel, or vertical body of the hydrant, is normally dry. A drain valve underground opens when the water valve is completely closed; this allows all water to drain from the hydrant body to prevent the hydrant from freezing. However, if a hydrant is not properly drained or has not been turned off, the barely will not be dry and freezing temperatures may damage such a hydrant. Thus, there is a need for an electronic module that can monitor the temperature of hydrant and the water level within a hydrant barrel.

Sixth, in warm areas, hydrants are used with one or more valves in the above-ground portion. Unlike cold-weather hydrants, it is possible to turn the water supply on and off to each port. This style is known as a "wet barrel" hydrant. There is a need for an electronic module that can monitor both the water level in a wet barrel hydrant as well as the water pressure inside the barrel. Additionally, there is a need for an electronic module that can monitor each port of a multiple port hydrant.

Seventh, there are several different types of hydrants in various states of operation that may be used by a water utility. Such hydrants may be painted in a color-coded manner to indicate the amount of water a hydrant is capable of providing to ad arriving firefighters in determining how much water is available and whether to call for additional resources, or locate another hydrant. In places such Ottawa, Canada, hydrant colors communicate different messages to firefighters; for example, if the inside of the hydrant is corroded so much that the interior diameter is too narrow for good pressure, it will be painted in a specific scheme to indicate to firefighters to move on to the next one. In many localities, a white or purple top indicates that the hydrant provides non-potable water. Thus, there is a need for a electronic module with a signaling device that may be user programmed to provide: (1) a visual and/or audible signal for locating a hydrant (e.g. in dark environments); (2) information as to the hydrant properties (e.g. flow rate and type of water); and (3) the operational status of the hydrant (e.g. operational, non-operational, low pressure, etc).

Preferably, the electronic module will comprise a transmitter for transmitting all or part of the above fire hydrant data to a utility provider perhaps using the utilities' existing automatic meter reading (AMR) system.

SUMMARY

Some of the objects and advantages of the invention will now be set forth in the following description, while other objects and advantages of the invention may be obvious from the description, or may be learned through practice of the invention.

Broadly speaking, a principle object of the present invention is to provide a fire hydrant with an integral smart monitor configured for monitoring and transferring information to firefighters and utility provides.

Another general object of the present invention is to provide a smart monitor configured for being associated with existing fire hydrant installations.

Still another general object of the present invention is to provide a smart fire hydrant monitor that can (1) detect when the fire hydrant has been serviced, and/or (2) be "told" when a fire hydrant has been serviced (and retain such information in memory). Such a device would preferably be programmed to track time and inform the utility when it is time for it to be serviced.

Yet another general object of the present invention is to provide a smart fire hydrant monitor comprising sensors that can monitor the hydrant's lubricating chamber for sufficient lubricant and notify a utility provider when insufficient lubricant is suspected.

Another object of the invention is to provide a smart monitor that can notify a utility when a hydrant is accessed with embodiments configured for recording sound and/or image data that may provide evidence useable for prosecuting those who steal water.

Still another general object of the present invention is to provide a smart monitor that monitors the fire hydrant for back flow.

A further general object of the present invention is to provide a smart monitor that monitors the temperature of hydrant and the water level within a hydrant barrel.

Another general object of the present invention is to provide a smart monitor configured to monitor the water level in a "wet barrel hydrant" as well as the water pressure inside the barrel. Additionally, such a monitor may be configured to monitor each port of a multiple port hydrant.

Still another general object of the present invention is to provide a smart monitor comprising a signaling device that may be user programmed to provide: (1) a visual and/or audible signal for locating a hydrant (e.g. in dark environments); (2) information as to the hydrant properties (e.g. flow rate and type of water); and (3) the operational status of the hydrant (e.g. operational, non-operational, low pressure, etc).

Yet another general object of the present invention is to provide a smart monitor comprising a transmitter for transmitting fire hydrant data to a utility provider.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which:

FIG. 15 is a close up view of a section of the smart fire hydrant cap depicted in FIG. 14 showing a cut away section.

Figure 1:
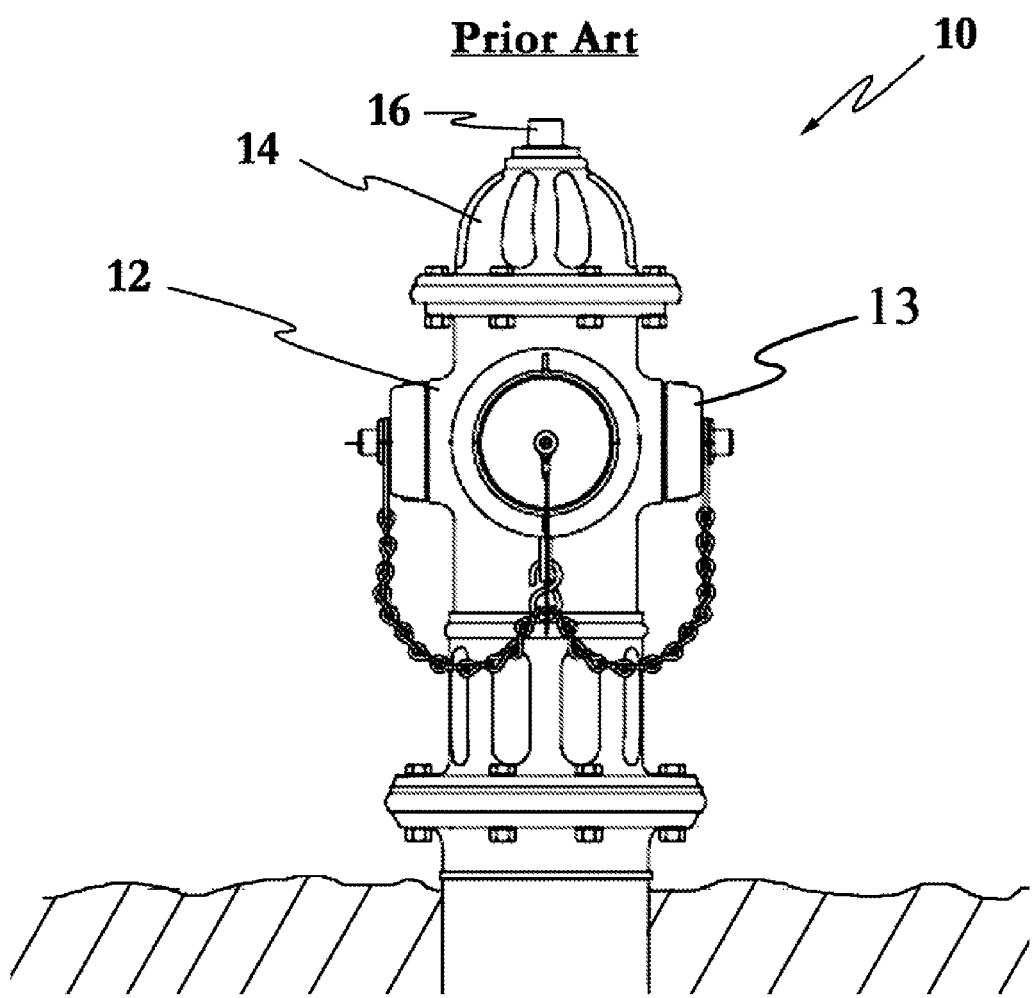
FIG. 1 is a side elevational view of a prior art water hydrant.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

It should be appreciated that this document contains headings. Such headings are simply place markers used for ease of reference to assist a reader and do not form part of this document or affect its construction.

For the purposes of this document, two items are "electrically associated" by bringing them together or into relationship with each other in any number of ways. For example, methods of electrically associating two electronic items/components include: (a) a direct, indirect or inductive communication connection, and (b) a direct/indirect or inductive power connection. Additionally, while the drawings illustrate various components of the system connected by a single line, it will be appreciated that such lines represent one or more connections or cables as required for the embodiment of interest.

Referring now to FIG. 1, one exemplary prior art water hydrant (10) is presented. Such water hydrant (10) comprises a top cap (14) mechanically associated with a barrel (12). Barrel (12) defines three access nozzles (13) configured for allowing access to the water supply associated with hydrant (10). At the top of hydrant (10) is an operating nut (16) for "turning on" the hydrant to allow water to flow through the hydrant and out an access nozzle (13).

Figure 2:
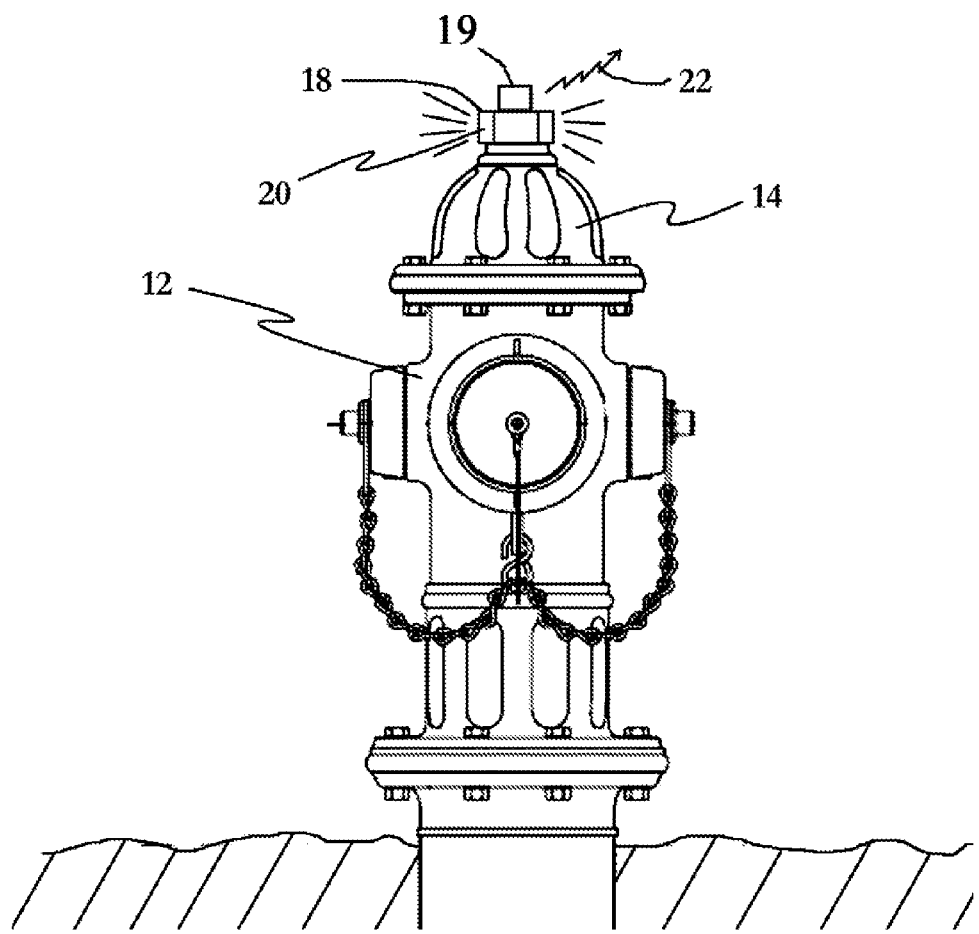
FIG. 2 is a side elevational view of the prior art water hydrant associated with a monitor according to one exemplary embodiment of the invention.
Figure 3:
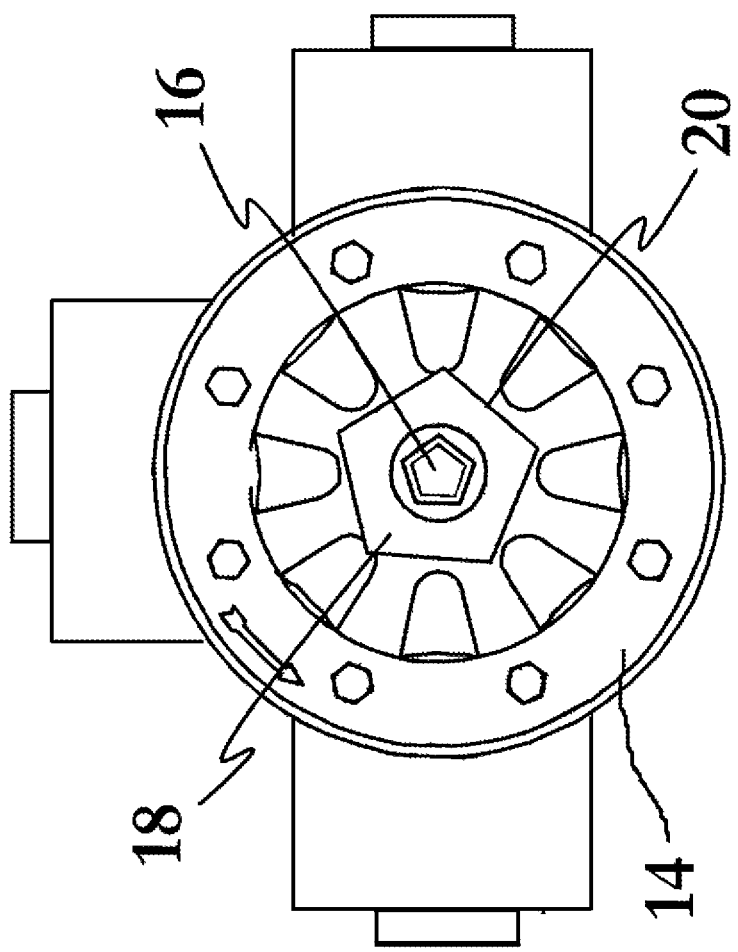
FIG. 3 is a top plan view of the hydrant depicted in FIG. 2.

Referring now to FIG. 2, a side elevational view of hydrant (10) associated with a monitor module (18) is presented. FIG. 3 shows a top view of the hydrant (10) configuration shown in FIG. 2. Monitor Module (18) is configured to be associated with operating nut (16) and provide a module-nut (19) mechanically associated with operating nut (16) so that when one wishes to turn on/off hydrant (10), module-nut (19) is used.

Monitor Module (18) further comprises alert element (20) configured to generate a visual signal (signaling device). Monitor module (18) is further configured with a transmitter (as described later) configured to generate RF signal (22).

Figure 4:
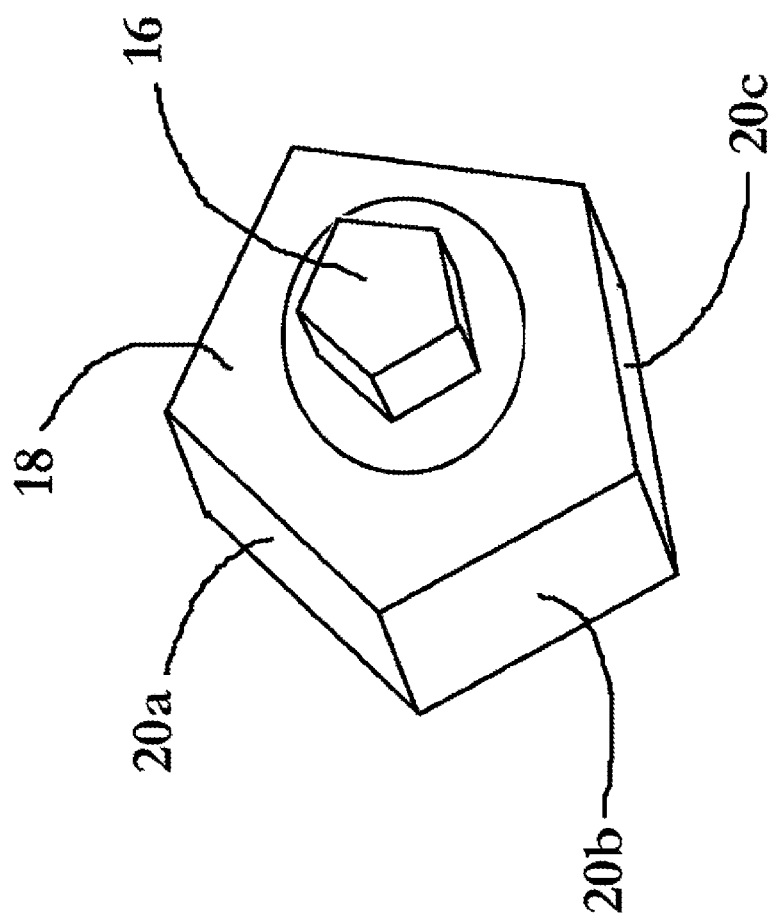
FIG. 4 is a top perspective view of the monitor depicted in FIG. 2.

Referring now to FIG. 4, an elevated perspective view of monitor module (18) is presented. As noted above, monitor module (18) comprises alert element (20). As depicted in FIG. 4, alert element (20) further comprises alert element (20a), (20b), and (20c) for generating alert signal in three different directions.

Figure 5:
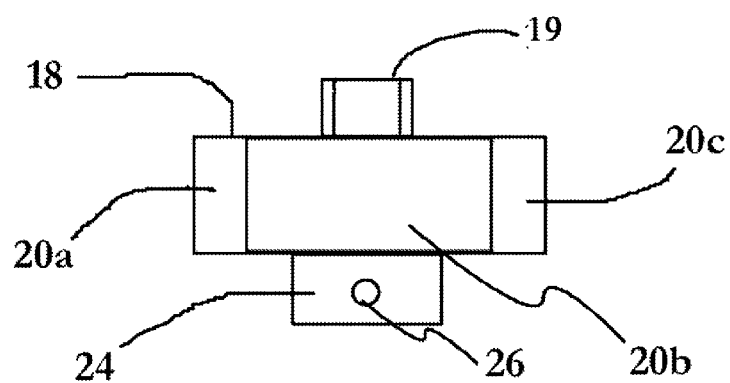
FIG. 5 is a top perspective view of the monitor depicted in FIG. 4.
Figure 6:
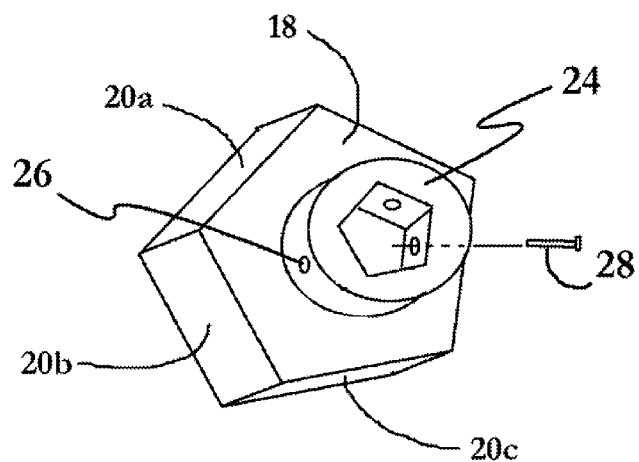
FIG. 6 is a bottom perspective view of the monitor depicted in FIG. 4.
Figure 7:
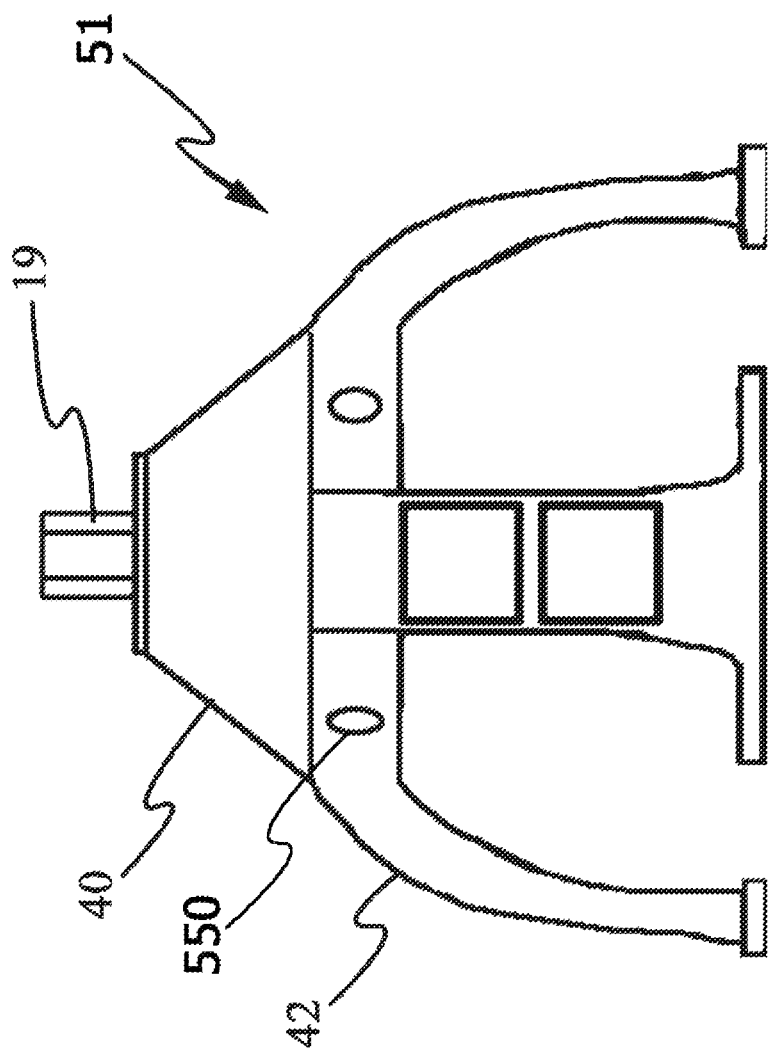
FIG. 7 is a side elevational view of one exemplary alternative embodiment of a hydrant monitor.
Figure 8:
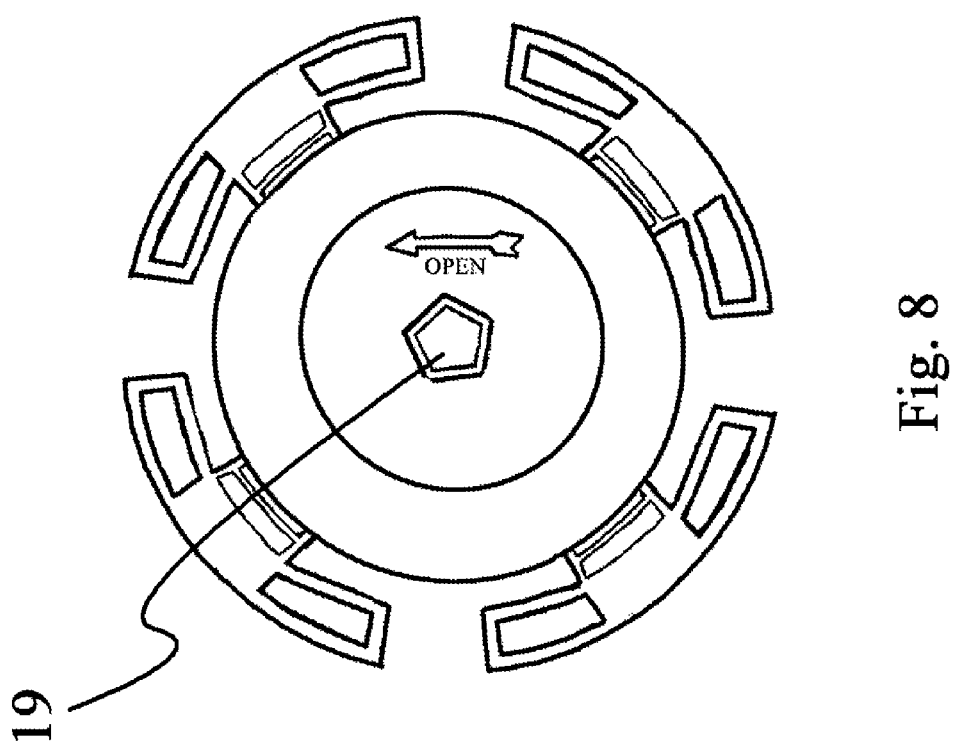
FIG. 8 is a top plan view of the hydrant monitor depicted in FIG. 7.
Figure 9:
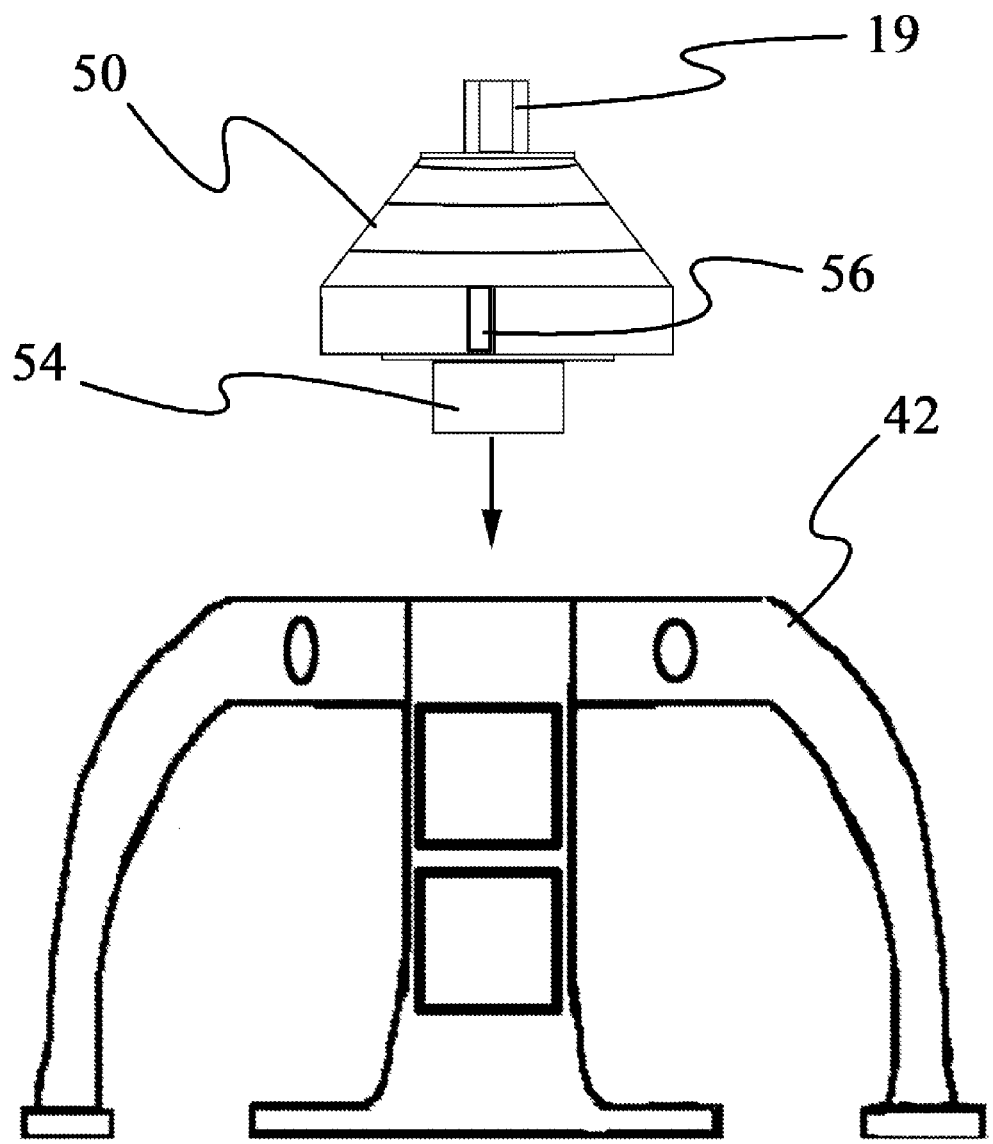
FIG. 9 is a partial exploded side elevational view of the hydrant monitor depicted in FIG. 7.
Figure 10:
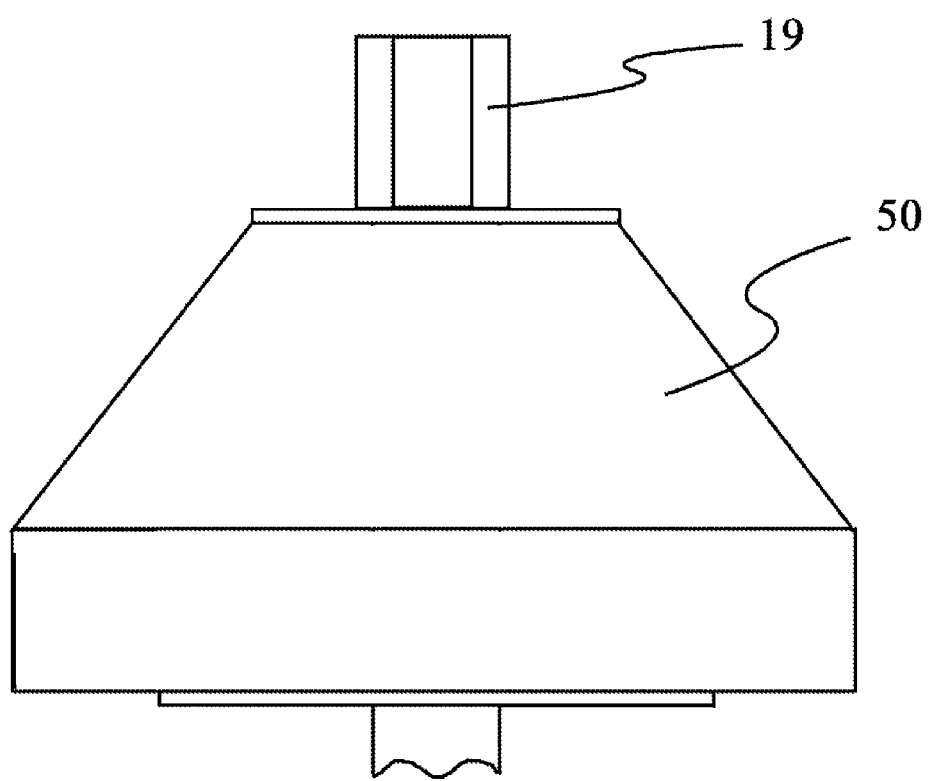
FIG. 10 is a side elevational view of the electronic insert depicted in FIG. 9.

Referring now to FIG. 5 and FIG. 6, a side view of monitor module (18) is presented. As shown in FIG. 6, monitor module (18) comprises operating nut receiver (24) configured for receiving operating nut (16). For the present embodiment of the invention, operating nut receiver (24) is mechanically associated with operating nut (16) with one or more securing pens (28). One of ordinary skill in the art will appreciate that for such a configuration, when module nut (19) is rotated; operating nut receiver (24) is rotated thereby rotating operating nut (16).

Referring now to FIG. 7, FIG. 8, FIG. 9, and FIG. 10 depicts one alternative embodiment of a monitor module. Monitor module (51) further comprises a frame (42) mechanically associated with an electronic module (50). The monitor module (51) may be the same module as described above for monitor module (18) including shape and internal electronics. For the embodiment depicted in FIG. 7, FIG. 8, FIG. 9, and FIG. 10, monitor module (51) defines a conical shape configured for being mechanically associated with frame (42).

Figure 11:
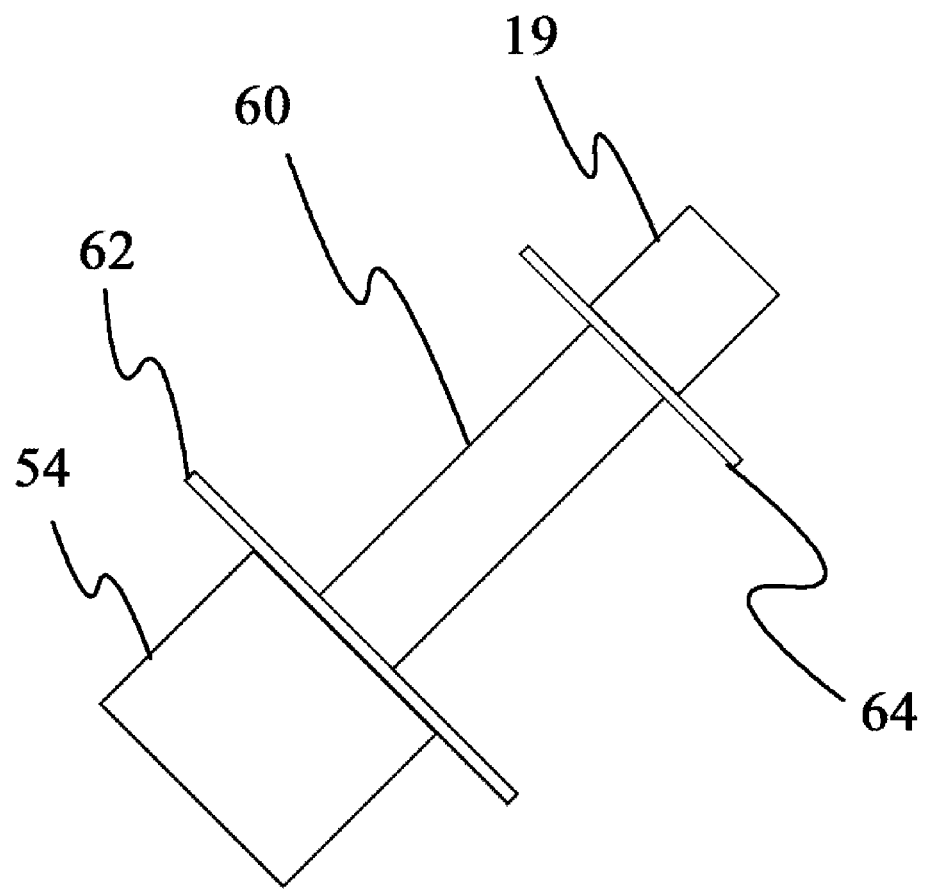
FIG. 11 is a tilted side elevational view of the nut extension for holding an electronic insert.

Referring now to FIG. 11, a side view of the operating nut extension is presented. The operating nut extension comprises a module-nut (19) at a first end and a nut-receiver (54) at the opposing second end separated by an extension-section (60). The nut extension extends through the approximate center of electronic module (50) which is disposed at least partially around extension-section (60) and between top plate (64) and bottom plate (62).

Figure 13:
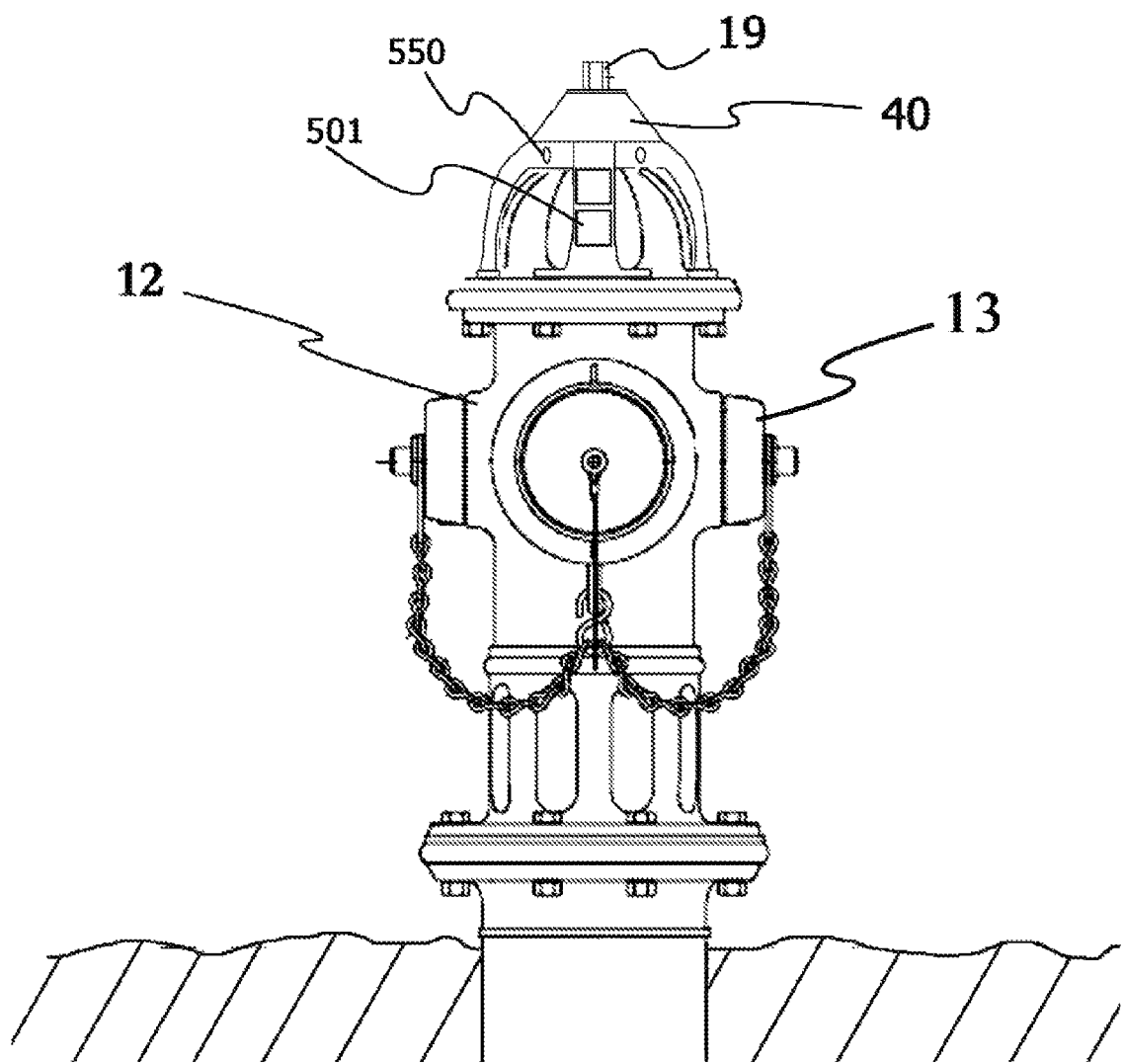
FIG. 13 is a side elevational the hydrant monitor of FIG. 7 associated with a prior art fire hydrant.

FIG. 13 shows monitor module (51) associated with a prior art fire hydrant (10) where the nut-receiver (54) is mechanically associated with the fire hydrant's operating nut (9) so that turning the nut extension turns operating nut (9) to allow or prevent the follow of water. The frame (42) if further mechanically associated with the fire hydrant to provide enhanced structural support. For this embodiment, the housing disposed between the first end and said second end the nut extension surrounds such nut extension.

Block Diagram

Figure 12:
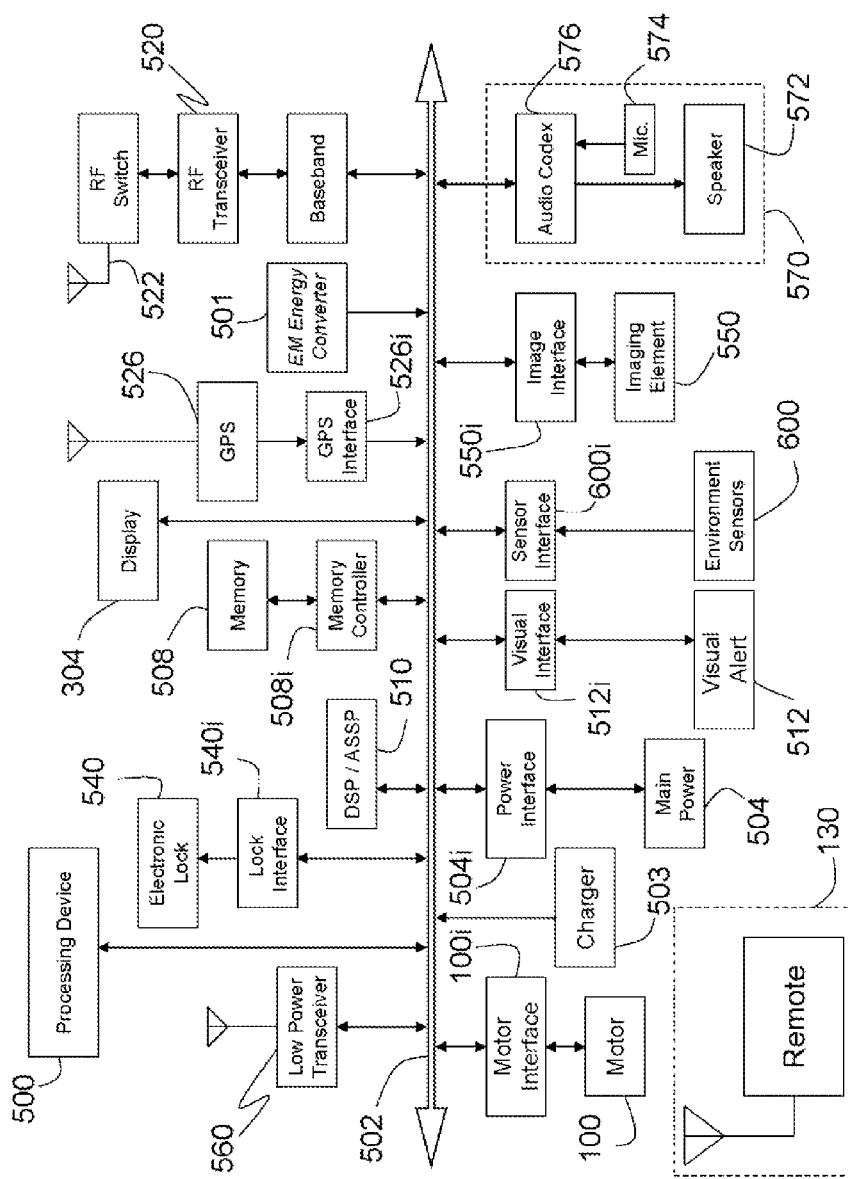
FIG. 12 is a block diagram representation of the components for one exemplary electronic module.

Referring now to FIG. 12, a block diagram representation of the various electronic components of the hydrant monitor (18) is presented. Initially it should be appreciated that FIG. 12 presents just one of a plurality of methods of electrically associating the various electronic components to achieve the features desired. For example, FIG. 12 presents the use of a common buss (502) for electrically associating the various components. It should be appreciated that embodiments where certain devices are electrically associated with each other without the use of a buss fall within the scope of the invention. In addition, various embodiments of hydrant monitor (10) may include all the features presented in FIG. 12, only a subset of subset of such features as well as features not specifically presented in FIG. 12.

For the preferred embodiment, the functional blocks of FIG. 12 represent ASSPs (Application Specific Standard Product), Complex Programmable Logic Devices (CPLD), ASICs (application specific integrated circuit), microprocessors, or PICs. In addition, one or more functional blocks may be integrated into a single device or chip sets such as ASSP chip sets. For example, one or more of the various interfaces described below may be integrated into (or have its described functions performed by) processing device (500).

Manufactures of suitable ASSP devices include Motorola, and Texas Instruments. While most of the functions are preferably performed by ASSP chip sets, Complex Programmable Logic Devices (CPLD) may be used to interface the various ASSP blocks to system buss (502) allowing one system component to interface with another component. Manufactures of suitable CPLD devices include Lattice's (ispMACH 4000 family) and (Altera's MAX 7000-series CPLD).

For the presently preferred embodiment of the invention, processing device (500) is configured to perform various tasks including data management, data storage, data transfers, resource monitoring, and system monitoring. Processing device (500) may be a simple PIC (such as the ones manufactured by MicroChip) or a relatively more complicated processor configured for use with standard operating systems and application software. Other technologies that may be used include ASICs (application specific integrated circuit) and ASSPs (application specific standard product). Processing device (500) may comprise onboard ROM, RAM, and EPROM type memories. Processing device (500) is electrically associated with buss (502).

Buss (502) is configured for providing a communication path between the various electronic devices electrically associated with buss (502). For example, Buss (502) is configured for transferring data signals between processing device (500) and other electronic devices electrically associated with buss (502). For the preferred embodiment, bus (500) also comprises electrical paths for transferring power between main power (504), EM power converter (501) and other electronic devices electrically associated with buss (502). Buss (502) my further comprise a data port and or a power port configured for supplying/receiving power or providing a communication path to electronic devices electrically associated with such port.

Memory (508) is electrically associated with buss (502) via memory controller (508i). Memory (508) may be any type of memory suitable for storing data such as flash memory, SRAM memory, hard drive memory, as well as other types of memories. Volatile memory continuously connected to a power source may be used, although, for the preferred embodiment, memory (508) is nonvolatile memory. Memory (508) may be used for storing all types of data including application programs, image data, sound data, customer information, sensor data, and warning-criteria. Memory (508) is electrically associated with processing device (500) via memory controller (508i) and buss (502).

DSP/ASSP (510) is electrically associated to processing device (500) via buss (502). DSP (510) is configured to perform signal processing tasks such as voice, audio, video, encoding, decoding as well as other data and signal processing functions.

For embodiments comprising a display, display (304) is configured for displaying the various hydrant monitor (10) data. Display (304) is electrically associated with buss (502) and may include technology for providing a customizable touch screen controller configured for control and decoding functions for display (304). For the preferred embodiment display (304) is a LCD display. Additionally, for one embodiment, display (304) comprises a "memory" configured to provide an image when power is removed from the display. For this embodiment, an image is written on the LCD display and when power is removed, the display will retain the image virtually indefinitely. Such a LCD display uses a technique developed by Zenithal Bistable Devices (ZBD), which adds a finely ridged grating to the inner glass surface of an LCD cell of Super-Twist-Nematic (STN) construction. As is known in the art the presence of the grating "latches" the polarization state of the liquid crystals and retains it when power is removed.

Hydrant monitor (10) my further comprise a graphics accelerator that provides support for megapixel cameras and 3D graphics applications. One suitable graphics accelerator is the MQ2100 manufactured by MediaQ.

For the presently preferred embodiment, motor (100) is electrically associated with processing device (500) through motor interface (100i). Motor (100) is a small electric motor that may be used in some embodiments to make visual element move (e.g. rotate) when active.

Exemplary communication circuitry is now considered. For one embodiment, relatively long range wireless communication circuitry includes RF transceiver (520) configured to transmit and receive data signals to/from a remote electronic device. It should be noted that embodiments where such communication circuitry comprises only a transmitter or only a receiver fall within the scope of the invention. For one embodiment, transceiver (520) comprises a relatively low power transmitter that transmits a data signal in an unlicensed frequency band. Other embodiments include a relatively longer range transmitter comprising any number of well known technologies for wireless communications transmitting at any legal power level. For example, transceiver (520) may be configured to communicate over GPRS, GSM, GPRS, 3G, and EDGE enabled networks as well as WAP networks.

To facilitate remote access to hydrant monitor (10), a networking system, such as a local area network (LAN) may be utilized. In this presently preferred embodiment, processing device (500) and memory (508) are configured to form a TCP/IP protocol suite and an HTTP (HyperText Transfer Protocol) server to provide two-way access to the hydrant monitor (10) data. Such TCP/IP protocols and HTTP server technology are well known in the art. For such an embodiment, hydrant monitor (10) includes an HTTP server and a TCP/IP protocol stack. A gateway is provided that enables continuous remote access to the hydrant monitor (10).

Generally speaking, a gateway may simply be a means for connecting two already compatible systems. Alternatively, a gateway may be a means for connecting two otherwise incompatible computer systems. For such an alternative configuration, the TCP/IP protocol suite may be incorporated into a gateway serving multiple hydrant monitor (10) devices via a wired or wireless two-way network using, for example, Wireless Fidelity (Wi-Fi) technology. Such a gateway may incorporate an HTTP server for accessing data from multiple hydrant monitor (10) devices and for transmission of data to individual user interface (10) devices.

In the above described TCP/IP enabled hydrant monitor (10) system, a remote transceiver provides access to a first network operating in accordance with a predetermined protocol (TCP/IP is one example). A plurality of hydrant monitor (10) devices may comprise a second network, such as a LAN.

A gateway operatively couples the first network to the second network. Finally, an HTTP server is embedded in either the gateway or the plurality of hydrant monitor (10) devices facilitating the transfer of data between the two networks. With such a configuration, one of ordinary skill in the art will appreciate that individual hydrant monitor (10) devices or groups of hydrant monitor (10) devices may be accessed as if the hydrant monitor (10) devices were a web site and their information could be displayed on a web browser.

Hydrant monitor (10) may further be configured for storing and/or generating location data (312). For embodiments that generate location data, hydrant monitor (10) includes a GPS device (526) electrically associated with processing device (500) via buss (502) and GSP Interface (526i). GPS (526) is one embodiment of a position-finder electrically associated with a processing device where GPS (526) is configured to generate position-data for the location of hydrant monitor (10). For such configurations, processing device (500) is configured to use such position-data to retrieve customer information stored in memory (508). If the customer information exists for a current position-data location, such customer information is retrieved and the user is provided an opportunity to use such data for the activity of interest. If the customer information does not exist, processing device (500) is further configured to create a new customer file for such position-data. The new position-data may be associated with customer information for further reference. Similarly, if apparatus (10) can not be located (perhaps it was "borrowed"), processing device (500) is further configured to transmit a data signal using RF transceiver (500) at least one of random intervals, predefined cyclic intervals, and upon remote request.

The attributes of exemplary main power (504) are now considered. For the presently preferred embodiment, main power (504) is a long life depletable power source such as a Li Ion battery that is independent from power source (501). For such embodiment, main power (504) comprises at least one long life rechargeable Li Ion battery such as the ones manufactured by A123 Systems®. Alternatively, (504) may be electrically associated with power source (501) or may be replaced by power source (501).

Extending the life of main power (504) or extending the time between recharging is one design concern addressed by power interface (504i). Power Interface (500i) is configured to perform power management functions for the system as well as monitor the status of main power (504) and report such status to devices electrically associated with buss (502) (such as processing device (500)). Power interface (504i) dynamically addresses power management issues by selectively powering down unutilized devices. For the Preferred embodiment, power interface (504i) is a CPLD that generates chip-select signals and powers down the various ASSPs as desired. Alternatively, processing device (500) may perform such power management functions.

Electronic lock (540) is electrically associated with processing device (500) through lock interface (540i) and buss (502). For this embodiment, lock interface (540i) is an ASSP or CPLD device configured to change the state of electronic lock (540) in response to control signals received from processing device (500). Similarly, lock interface (540i) may be further configured to communicate the status of electronic lock (540) to devices electrically associated with buss (502). Electronic lock (540) may be a software lock that prevents access to various functions provided by user interface (500). In addition, electronic lock (540) may further be a mechanical lock that prevents they hydrant output ports from being opened.

Imaging element (550) is electrically associated with processing device (500) through image interface (550i) and buss (502). Imaging element (550) and image interface (550i) are configured for acquiring and transferring images to electronic devices electrically associated with buss (405). For the preferred embodiment, imaging interface (550i) is configured to support CMOS image input sensors such as the one manufactured by Micron® and/or CCD (charge-coupled device) image input sensors such as the ones manufactured by ATMEL® sensors. Imaging interface (550i) performs the necessary processing functions to convert the imaging data into a desired format before transferring such data to other devices associated with buss (502).

Low Power transceiver (560) would typically comprise a low power transmitter relative to transceiver (520). For the embodiment in FIG. 12, low power transceiver (560) operates in an unlicensed band although frequencies requiring a license may be used. Suitable technologies include Bluetooth and Zigbee (IEEE 802.15). Zigbee is a low data rate solution for multi-month to multi-year battery life applications. Zigbee operates on an unlicensed, international frequency band. Such technologies are known and understood by those skilled in the art, and a detailed explanation thereof is not necessary for purposes of describing the method and system according to the present invention. Low power transceiver (560) is configured for short range communication with other suitably configured devices.

Attention now is directed to audio module (570). For the preferred embodiment, audio module (570) comprises speaker (572) and microphone (474) electrically associated with audio codex (576). Audio module (570) is configured for detecting sound waves and converting such waves into digital data of a predefined format such as MP3. Sound waves may also be generated by audio module (570) using speaker (572) to issue warnings and provide for other forms of communications. For example, audio module (570) may be used for voice communications between a person located at hydrant monitor (10) and a person located at a remote site, using, for example, VoIP for the IP enabled systems describe earlier.

EM (electromagnetic) Energy Converter (501) is associated with a portion of the outer sides of hydrant monitor (10). EM Energy Converter (501) is configured to convert electromagnetic energy (such as a radiated RF signal from a man made transmitter, sunlight, etc.) into a voltage for supplying power to system components and/or supplying energy to a power source. One well known EM Energy Converter is a photovoltaic cell.

Figure 14:
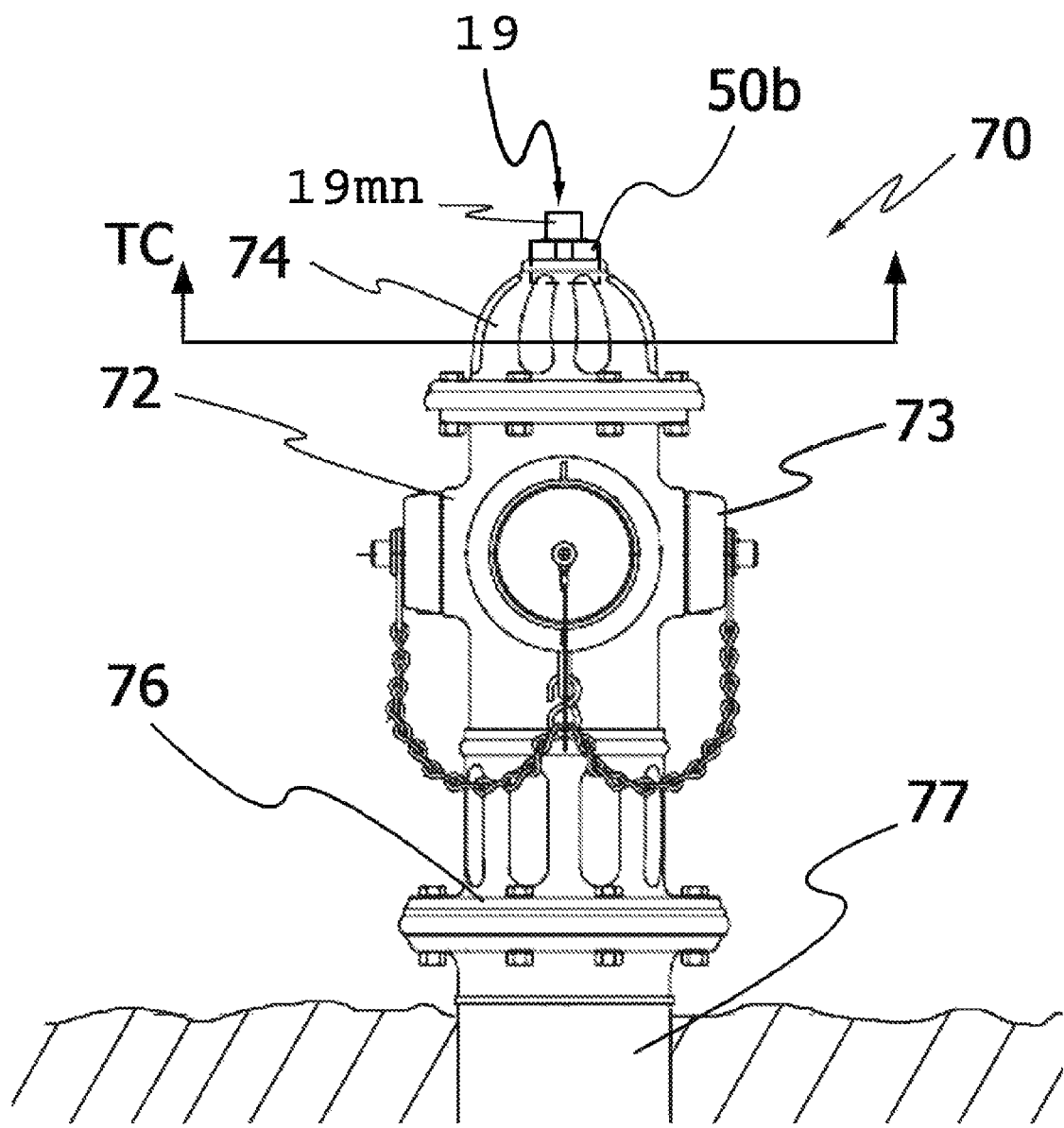
FIG. 14 is a side elevational view of a smart fire hydrant comprising a smart fire hydrant cap.

Referring now to FIG. 14, a variation of the above embodiments is a smart fire hydrant (70). For such a configuration, smart fire hydrant (70) comprises a top cap (74) mechanically associated with a barrel (72) comprising a barrel input (76) configured for being associated with a water source (77) and wherein said barrel further defines a plurality of barrel outputs (73) in fluid communication with said barrel input and wherein each barrel output defines an access nozzle configured for allowing access to its respective barrel output. An elongated operating nut (19) (some might call this "nut" a "bolt") extends from the inside of said barrel to a point that is a predefined distance beyond said top cap (74) wherein said predefined distance defines a module interface point (71, FIG. 15) and wherein the distal end of said elongated operating nut defines a module-nut (19nm).

As described above, the module-nut (19nm) is configured so that rotating said module-nut in a first on-direction increases the flow path between said barrel input and at least one barrel output and wherein rotating said module-nut in the opposite off-direction decreases the flow path between said barrel inputs and said at least one barrel output. Increasing the flow-path means that if water is present, more water will flow. Decreasing the flow-path means the opposite.

A module housing is disposed between said module-nut (19) and said top cap (74) so that said housing, configured for housing monitor (50b), at least partially surrounds a portion of said module-nut (19). At least part of monitor (50b) has access to the inside of top portion of top cap (74) as shown in FIG. 15 thereby defining an inner-section (50i). Inner-section (50i) is called the "inner section" because it has access to the inside of the fire hydrant. The module housing is further configured to rotate when said module-nut (19) rotates. As noted in FIG. 15, a processing device (500) is disposed within said housing wherein said processing device (500) is electrically associated with at least one of (a) an integral memory and (b) an external memory (508). A motion-sensor (600) is disposed within said housing and electrically associated with said processing device (500) and mechanically associated with the module-nut (19). The motion-sensor (600) generates signals indicative of the state of the module-nut (19) and preferably generates a plurality of signals depending on the motion and direction of motion. One suitable motion sensor is an accelerometer.

The processing device (500) is configured to monitor said motion-sensor (600) to determine when the motion-nut (19) is being rotated and what direction it is being rotated. A transmitter is electrically associated with said processing (500) device and is configured to transmit an access-signal depending on the motion-sensor signals generated by motion-sensor (600).

As before, a power source (504) is disposed within said housing and electrically associated with at least one of said processing device (500), said motion-sensor (600), and said transmitter.

Radiation Sensors

For yet another embodiment, an ionizing radiation sensor (600) is electrically associated with the processing device (600). It should be noted that motion-sensor (600) and ionizing radiation sensor (600) belong to the general group of sensors referred to as environmental sensors (600). Such radiation sensor (600) is configured for detecting at least one of Alpha, Beta, Neutron, and gamma radiation coming from at least one of outside the fire hydrant or from within said fire hydrant. Suitable radiation sensors (600) are scintillation counters comprising a transparent crystal (such as phosphor) or organic liquid that fluoresces when struck by ionizing radiation.

Yet another suitable sensor (600) is a container filled with a noble gas electrically associated with a current sensing circuit which is electrically associated with an analog-to-digital converter input of the processing device.

Yet another suitable sensor is a multi-layer memory chip, referred to herein as a RAD chip or RAD memory, configured to use the electrical property of capacitance to store data bits. One suitable memory chip is the DRAM with at least one capacitor and transistor per data bit. Such memory is programmed with a predefined memory pattern. To better appreciated who the RAD chip works, some background information is now provided.

Soft Errors

In the early days of computers, 1970s, and with the introduction of dynamic RAM memory, "glitches" or "soft errors", caused by transient "bit-flips" which appeared to be random events, were common. Such events corrupted the data stored in memory without damaging the memory. Thus, in a computer's memory system, a soft error changes an instruction in a program or a data value and such soft errors were typically corrected by "cold booting" or "re booting" the computer system with the corrupted data.

One of the causes of such "soft errors" was alpha particle strikes. Because an alpha particle contains a positive charge and kinetic energy, the particle can hit a memory cell and cause the cell to change state to a different value. The atomic reaction is so tiny that it does not damage the actual structure of the chip. The positively charged alpha particle travels through the semiconductor and disturbs the distribution of electrons. If the disturbance is large enough, a digital signal can change from a 0 to a 1 or vice versa. In components such as latches and RAM, such transient upsets can change data bits that become stored in the associated memory chip for an indefinite time.

All prior art memory designers takes steps to minimize the rate of soft errors. For the currently preferred embodiment of the invention, however, a RAD memory chip does not. The Rad Memory chip is configured to enhance the "soft error" effect. For example, when a high energy particle passes through such memory chip, it will likely pass through at least one transistor that is in the off state (for example). Such alpha particle will generate a voltage potential across such transistor's base to ground causing such transistor to conduct and flip the charge of its respective capacitor. As a result, the predefined memory pattern stored in the RAD chip becomes "corrupted". The more high energy particles striking the RAD chip, the more data corruption experienced.

The processing device (500) is configured to first store a known memory pattern in the RAD chip for RAD Sensor (600). Then processing device (500) would further perform periodic memory pattern test to determine if the memory pattern has become corrupted. If data corruption is found, a corruption routine is performed to determine if the pattern corruption is significant enough to meet predefined warning criteria (because some corruption could be caused by natural phenomena such as cosmic rays and normal packing decay) When the pattern of corruption is deemed to be significant enough to meet or surpassed the warning threshold, a warning is issued. Otherwise, the processing device may be programmed to reprogram the memory with an uncorrupted memory pattern and start the process over One of ordinary skill in the art will appreciate that using multiple layers of memory allows the processing device (500) to determine the direction of travel of the high energy particle, and thus, the direction to the source of such high energy particles and if the source is moving (e.g. in a moving vehicle). As noted above, such radiation sensor (600) is preferably configured for detecting at least one of Alpha, Beta, Neutron, and gamma radiation coming from at least one of outside the fire hydrant or from within said fire hydrant. Thus, the disclosed RAD-Memory can be used by processing device (500) to monitor water flowing out of or into a fire hydrant as well as monitor the environment surrounding the outside of the fire hydrant (e.g. vehicles traveling down a highway or the ambient air) for sources of radiation and then report same to a remote device.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A smart module configured for monitoring a fire hydrant, said smart monitor module comprising:
    an operating-nut-extension defining a module-nut at a first end and a nut-receiver at an opposing second end wherein said module-nut and said nut-receiver are separated by an extension-section and wherein said nut-receiver is configured for being mechanically associated with a fire hydrant with a plurality of output ports and wherein said turn on nut is configured to control the flow of a flow of a fluid to said plurality of output ports so that rotating said module-nut rotates said fire hydrant turn on nut thereby providing fluid to all of the fire hydrant output ports;
    a housing disposed between said first end and said second end and at least partially surrounding said extension-section;
    a processing device disposed within said housing wherein said processing device is associated with a memory that is at least one of (a) integral memory and (b) external memory, wherein said memory is configured for storing at least one of radiation-threshold-data and warning-criteria-data;
    an ionizing radiation sensor electrically associated with said processing device, said radiation sensor configured to generate a radiation-signal reflective of ionizing radiation striking said radiation sensor, and wherein said processing device is configured to use said radiation-signal and said radiation-threshold-data to generate radiation-status-data;
    a transmitter electrically associated with said processing device;
    a power source disposed within said housing and electrically associated with at least one of said processing device, said radiation sensor, and said transmitter; and
    wherein said processing device is further configured to transmit a data-signal comprising at least part of radiation-status-data.

2. A smart module configured for monitoring a fire hydrant as in claim 1, further comprising a motion-sensor electrically associated with said processing device wherein said motion-sensor is configured to monitor the operating-nut-extension for movement and generate a movement-signal when movement is detected and wherein said processing device is configured to detect said movement-signal and generate fire hydrant status data and wherein said processing device is further configured to transmit an data-signal comprising at least part of said fire hydrant status data.

3. A smart module configured for monitoring a fire hydrant as in claim 1, further comprising:
    a nut-ring disposed between said extension-section and said module-nut thereby defining the transition from said extension-section to said module-nut; and
    a receiver-ring disposed between said extension-section and said nut-receiver thereby defining the transition from said extension-section to said nut receiver.

4. A smart module configured for monitoring a fire hydrant as in claim 1, further comprising: a signaling device electrically associated with said processing device and wherein said processing device is configured to activate said signaling device to provide an indication of a hydrant property.

5. A smart module configured for monitoring a fire hydrant as in claim 4, wherein said hydrant property is one of flow rate, pressure and water type.

6. A smart module configured for monitoring a fire hydrant as in claim 1, said smart module further comprising:
    a receiver electrically associated with said processing device wherein said processing device is configured to use said receiver to detect a signal from a remote transmitter and activate a signaling device in response to detecting said signal; and
    a signaling device electrically associated with said processing device and wherein said processing device is configured to activate said signaling device to provide one of a dry barrel identification and a wet barrel identification.

7. A smart module configured for monitoring a fire hydrant as in claim 6, wherein said processing device is further configured to activate said signaling device to provide one of an operational and non-operational identification.

8. A smart module configured for monitoring a fire hydrant as in claim 1, said smart module further comprising:
    a receiver electrically associated with said processing device wherein said processing device is configured to use said receiver to detect a signal from a remote transmitter and activate a signaling device in response to detecting said signal;
    a pressure sensor electrically associated with said processing device and configured to measure the water pressure inside said fire hydrant; and
    a signaling device electrically associated with said processing device and wherein said processing device is configured to activate said signaling device to provide at least one of (a) a wet barrel identification and (b) water pressure indication.

9. A smart module for fire hydrants, said smart module comprising:
    a housing configured for being mechanically associated with a fire hydrant turn on nut wherein said fire hydrant defines a plurality of outputs and wherein said turn on nut is configured to control the flow of a fluid to said plurality of output ports;
    a processing device disposed within said housing wherein said processing device is associated with a memory wherein said memory is at least one of (a) integral memory and (b) external memory, wherein said memory is configured for storing at least one of radiation-threshold-data and warning-criteria-data;
    an ionizing radiation sensor electrically associated with said processing device, said radiation sensor configured to generate a radiation-signal reflective of ionizing radiation striking said radiation sensor, and wherein said processing device is configured to use said radiation-signal and said radiation-threshold-data to generate radiation-status-data;
    a transmitter electrically associated with said processing device;
    a power source disposed within said housing and electrically associated with at least one of said processing device, said radiation sensor, and said transmitter; and
    wherein said processing device is further configured to transmit a data-signal comprising at least part of radiation-status-data.

10. A smart module for fire hydrants as in claim 9, wherein said ionizing radiation is one of Alpha, Beta, Neutron, and gamma radiation coming from at least one of outside the fire hydrant or from within said fire hydrant.

11. A smart module for fire hydrants as in claim 10, wherein said radiation sensor comprises a container filled with a noble gas electrically associated with a current sensing circuit which is electrically associated with an analog-to-digital converter input of said processing device.

12. A smart module for fire hydrants as in claim 9, wherein said radiation sensor is a memory chip electrically associated with said processing device, said memory chip configured to use one of (a) the electrical property of capacitance and (b) the electrically property of conductance to store a memory pattern of data bits.

13. A smart module for fire hydrants as in claim 12, wherein said processing device performs periodic memory pattern test to determine if the memory pattern has become corrupted.

14. A smart module for fire hydrants as in claim 13, wherein said memory chip comprises multiple layers and wherein said processing device is configured to determine the direction of travel of a high energy particle striking said memory chip.

* * * * *